(12) United States Patent
Anugu et al.

(10) Patent No.: US 8,788,714 B2
(45) Date of Patent: Jul. 22, 2014

(54) METHOD FOR SYNCHRONIZING EXECUTION OF MULTIPLE PROCESSING DEVICES AND RELATED SYSTEM

(75) Inventors: Ram Mohan Anugu, Nizamabad (IN); Adrianus Cornelis Maria Hamers, Berkel-Enschot (NL)

(73) Assignee: Honeywell International Inc., Morristown, NJ (US)

( * ) Notice: Subject to any disclaimer, the term of this patent is extended or adjusted under 35 U.S.C. 154(b) by 525 days.

(21) Appl. No.: 12/697,085

(22) Filed: Jan. 29, 2010

(65) Prior Publication Data
US 2011/0191497 A1  Aug. 4, 2011

(51) Int. Cl.
*G06F 15/16* (2006.01)

(52) U.S. Cl.
USPC ............... 709/248; 709/251; 463/29; 435/7.1

(58) Field of Classification Search
CPC .......................................................... G06F 1/12
USPC ........................ 709/248, 251; 463/29; 435/7.1
See application file for complete search history.

(56) References Cited

U.S. PATENT DOCUMENTS

| | | | | |
|---|---|---|---|---|
| 4,497,059 A | * | 1/1985 | Smith | ........................... 714/797 |
| 4,615,029 A | * | 9/1986 | Hu et al. | ........................ 370/449 |
| 5,784,636 A | * | 7/1998 | Rupp | ............................... 712/37 |
| 8,086,752 B2 | * | 12/2011 | Millington | .................... 709/231 |
| 2003/0203400 A1 | * | 10/2003 | Strehlau et al. | ................. 435/7.1 |
| 2004/0088436 A1 | * | 5/2004 | Katta et al. | ..................... 709/248 |
| 2007/0282589 A1 | * | 12/2007 | Bershteyn et al. | .............. 703/23 |
| 2008/0144668 A1 | * | 6/2008 | Hall et al. | ...................... 370/503 |
| 2010/0145481 A1 | * | 6/2010 | Philipps | .......................... 700/32 |
| 2010/0291999 A1 | * | 11/2010 | Nagatomo et al. | .............. 463/29 |
| 2011/0191497 A1 | * | 8/2011 | Anugu et al. | ................. 709/248 |

* cited by examiner

*Primary Examiner* — Michael C Lai

(57) ABSTRACT

A system includes multiple processing devices. Each processing device is configured to receive first and second status flags from first and second neighboring processing devices, respectively. Each status flag identifies whether one or more of the processing devices are ready for operation. Each processing device is also configured to determine that all processing devices are ready for operation using the status flags. Each processing device is further configured to wait for a specified amount of time before entering operation. The specified amount of time is selected so that the processing devices are substantially synchronized. The processing devices could be coupled together in a ring configuration, the first neighboring processing device could include a right neighboring processing device in the ring configuration, and the second neighboring processing device could include a left neighboring processing device in the ring configuration.

22 Claims, 5 Drawing Sheets

METHOD FOR SYNCHRONIZING EXECUTION OF MULTIPLE PROCESSING DEVICES AND RELATED SYSTEM

TECHNICAL FIELD

This disclosure relates generally to processing systems. More specifically, this disclosure relates to a method for synchronizing execution of multiple processing devices and related system.

BACKGROUND

Conventional processing systems routinely include multiple processing devices, such as multiple microprocessors. Often times, these processing devices reside on different printed circuit boards and operate using different clock signals. These processing devices may execute related instructions or otherwise perform related operations. It may be necessary or desirable to synchronize the multiple processing devices so that they are substantially synchronized in operation. However, this can often be a difficult task.

SUMMARY

This disclosure provides a method for synchronizing execution of multiple processing devices and related system.

In a first embodiment, a system includes multiple processing devices. Each processing device is configured to receive first and second status flags from first and second neighboring processing devices, respectively. Each status flag identifies whether one or more of the processing devices are ready for operation. Each processing device is also configured to determine that all processing devices are ready for operation using the status flags. Each processing device is further configured to wait for a specified amount of time before entering operation. The specified amount of time is selected so that the processing devices are substantially synchronized.

In a second embodiment, a method includes receiving, at a first processing device, status flags from at least one additional processing device. Each status flag identifies whether one or more of the processing devices are ready for operation. The method also includes determining that all processing devices are ready for operation using at least one of the status flags. The method further includes waiting for a specified amount of time before entering operation. The specified amount of time is selected so that the processing devices are substantially synchronized.

In a third embodiment, a tangible computer readable medium embodies a computer program. The computer program includes computer readable program code for receiving, at a first processing device, status flags from at least one additional processing device. Each status flag identifies whether one or more of the processing devices are ready for operation. The computer program also includes computer readable program code for determining that all processing devices are ready for operation using the status flags. The computer program further includes computer readable program code for waiting for a specified amount of time before entering operation. The specified amount of time is selected so that the processing devices are substantially synchronized.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 4B, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
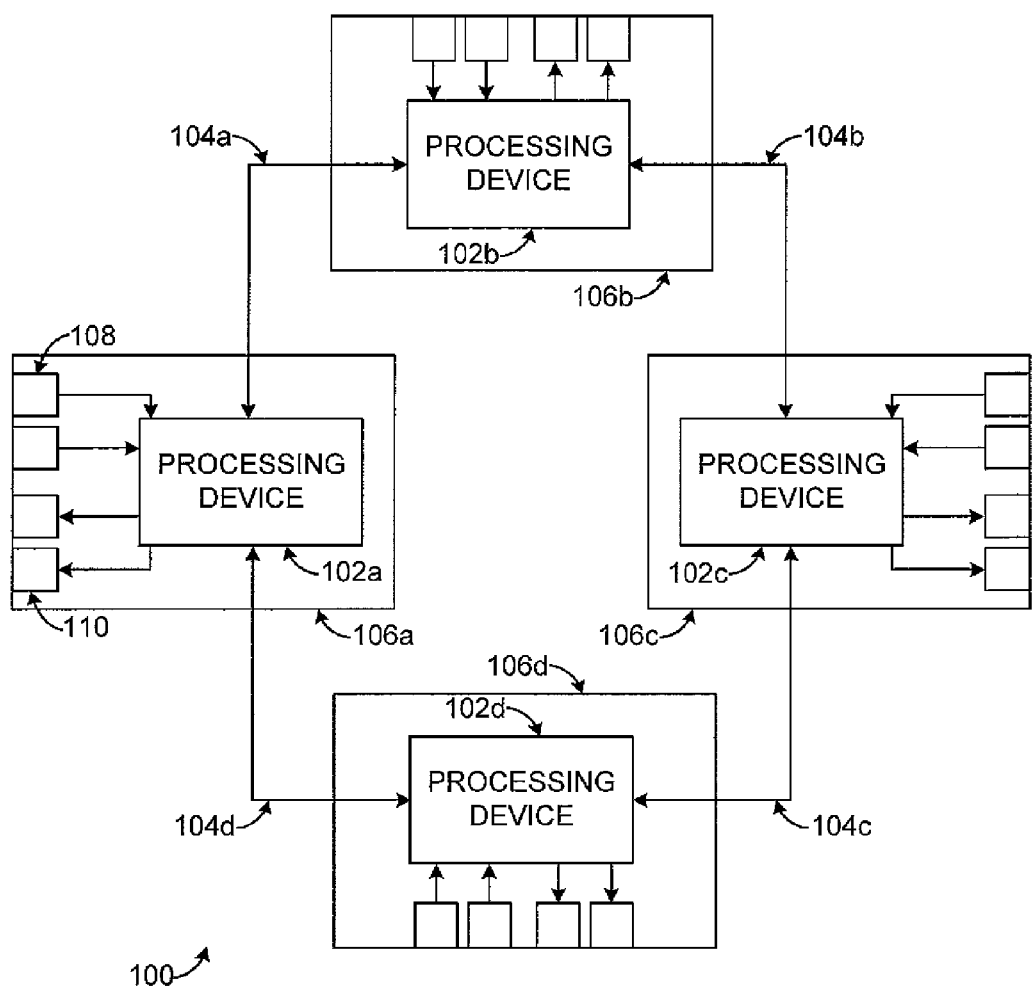
FIG. 1 illustrates an example system for synchronizing execution of multiple processing devices according to this disclosure.

FIG. 1 illustrates an example system 100 for synchronizing execution of multiple processing devices according to this disclosure. As shown in FIG. 1, the system 100 includes multiple processing devices 102a-102d. Each processing device 102a-102d represents any suitable structure for executing instructions or otherwise performing one or more functions. The functions may vary widely depending on the specific application. In some embodiments, the processing devices 102a-102d represent microprocessors, microcontrollers, field programmable gate arrays (FPGAs), or application specific integrated circuits (ASICs). In particular embodiments, the processing devices 102a-102d represent microprocessors executing instructions for performing control functions in an industrial process control system. While FIG. 1 illustrates four processing devices 102a-102d, the system 100 could include two or more processing devices.

In this example, the processing devices 102a-102d are coupled in a ring configuration using four communication links 104a-104d. Each communication link 104a-104d represents any suitable communication medium for transporting data between processing devices. As particular examples, the communication links 104a-104d could include serial or parallel signal traces formed on printed circuit boards (PCBs) 106a-106d, as well as electrical or other connections (such as optical connections) between the PCBs 106a-106d.

In FIG. 1, the processing devices 102a-102d reside on different PCBs 106a-106d. Each PCB 106a-106d includes any suitable structure on which at least one processing device, other integrated circuits, and signal traces are formed. While FIG. 1 shows one processing device on each PCB, at least two processing devices 102a-102d could reside on a common PCB. In general, the system 100 could include any number of processing devices residing on any number of PCBs or other structures, where the processing devices are to be synchronized.

In this example embodiment, each processing device 102a-102d is coupled to one or more input terminals 108 and one or more output terminals 110. Each input terminal 108 represents any suitable structure for receiving an input signal. Each output terminal 110 represents any suitable structure for providing an output signal. Moreover, a terminal could represent an input/output terminal, which could be used for both input and output communications.

In one aspect of operation, at least two processing devices 102a-102d operate using different clock signals. In particular embodiments, each processing device 102a-102d resides on a different PCB 106a-106d and operates using its own clock signal. Because different clock signals are used by different processing devices 102a-102d, the processing devices 102a-102d can be substantially synchronized so that their operations are substantially synchronized. This may be needed, for example, when the processing devices 102a-102d execute the same general control algorithm in an industrial process control system.

In accordance with this disclosure, the processing devices 102a-102d support a synchronization mechanism for synchronizing the processing devices 102a-102d with one another. In some embodiments, the synchronization mechanism is used so that the processing devices 102a-102d execute the same instructions or other logic synchronously. This allows, for example, an application to be distributed among the processing devices 102a-102d and for the devices to synchronize their respective clocks and their respective executions of the application. Also, the processing devices 102a-102d may not start up at the same time, and the synchronization mechanism can be used to synchronize the processing devices 102a-102d in these circumstances. It may be noted that while the processing devices 102a-102d can execute the same application or other logic, they could execute different functions depending on their relative positions amongst each other. Additional details regarding the synchronization mechanism are provided below.

Although FIG. 1 illustrates one example of a system 100 for synchronizing execution of multiple processing devices, various changes may be made to FIG. 1. For example, the system 100 could include n processing devices in any suitable configuration, where n≥2. Also, while a single communication link is shown connecting each pair of processing devices, each pair of processing devices could be coupled by multiple communication links.

Figure 2:
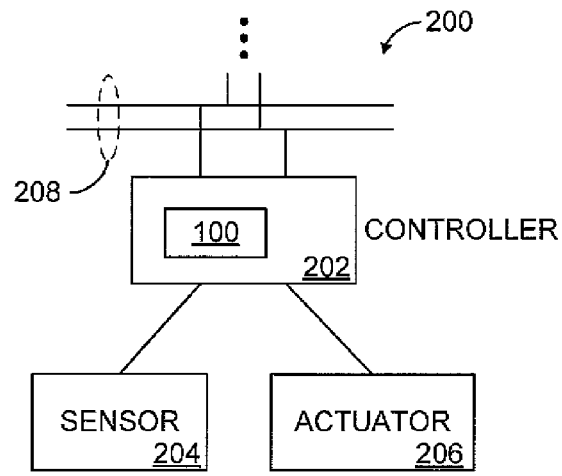
FIG. 2 illustrates a portion of an example industrial process control system according to this disclosure.

FIG. 2 illustrates a portion of an example industrial process control system 200 according to this disclosure. As shown in FIG. 2, the process control system 200 includes an industrial process controller 202, which is used to control at least a portion of an industrial process performed by a process system. The process controller 202 could, for example, receive measurements of various characteristics within a process system and generate control signals for altering other characteristics within the process system. The controller 202 includes any suitable structure for controlling at least a portion of an industrial process. The controller 202 could, for example, represent a computing device that executes a control application or other control logic. Also, a process system may generally represent any system or portion thereof configured to process one or more products or other materials in some manner.

In this example, the process controller 202 is coupled to one or more sensors 204 and one or more actuators 206. The sensors 204 and actuators 206 represent components in a process system that may perform any of a wide variety of functions. For example, the sensors 204 could measure a wide variety of characteristics in the process system, such as temperature, pressure, or flow rate. Also, the actuators 206, such as heaters, motors, or valves, could alter a wide variety of characteristics in the process system. Each sensor 204 includes any suitable structure for measuring one or more characteristics in a process system. Each actuator 206 includes any suitable structure for operating on or affecting one or more conditions in a process system.

The process controller 202 is also coupled to one or more networks 208, which facilitate communication between various components in the process control system 200. The networks 208 could, for example, facilitate communication between the controller 202 and higher-level controllers or other components in the process control system 200. The networks 208 includes one or more local area networks, metropolitan area networks, wide area networks (WANs), all or a portion of a global network, or any other communication system or systems at one or more locations. As a particular example, the networks 208 could represent a pair of Ethernet networks or a redundant pair of Ethernet networks, such as a FAULT TOLERANT ETHERNET (FTE) network from HONEYWELL INTERNATIONAL INC.

In this illustrated embodiment, the process controller 202 includes the system 100 for synchronizing execution of multiple processing devices shown in FIG. 1. The processing devices 102a-102d in the system 100 could be used, for example, to receive sensor measurements from the sensors 204 and generate control signals for the actuators 206. The use of the synchronization mechanism in the system 100 can help to ensure that all processing devices 102a-102d read data from and write data to field devices (such as the sensors 204 and actuators 206) synchronously. As a particular example, in the controller 202, every processing device 102a-102d could act as a primary control device and can read field device inputs and drive field device outputs at the same time.

Although FIG. 2 illustrates one portion of an example industrial process control system 200, various changes may be made to FIG. 2. For example, the process controller 202 could be coupled to any number of sensors and actuators. Also, FIG. 2 illustrates one example operational environment in which the system 100 could be used. The system 100 could be used in any other device or system (whether or not the device or system is process control-related).

Figure 3B:
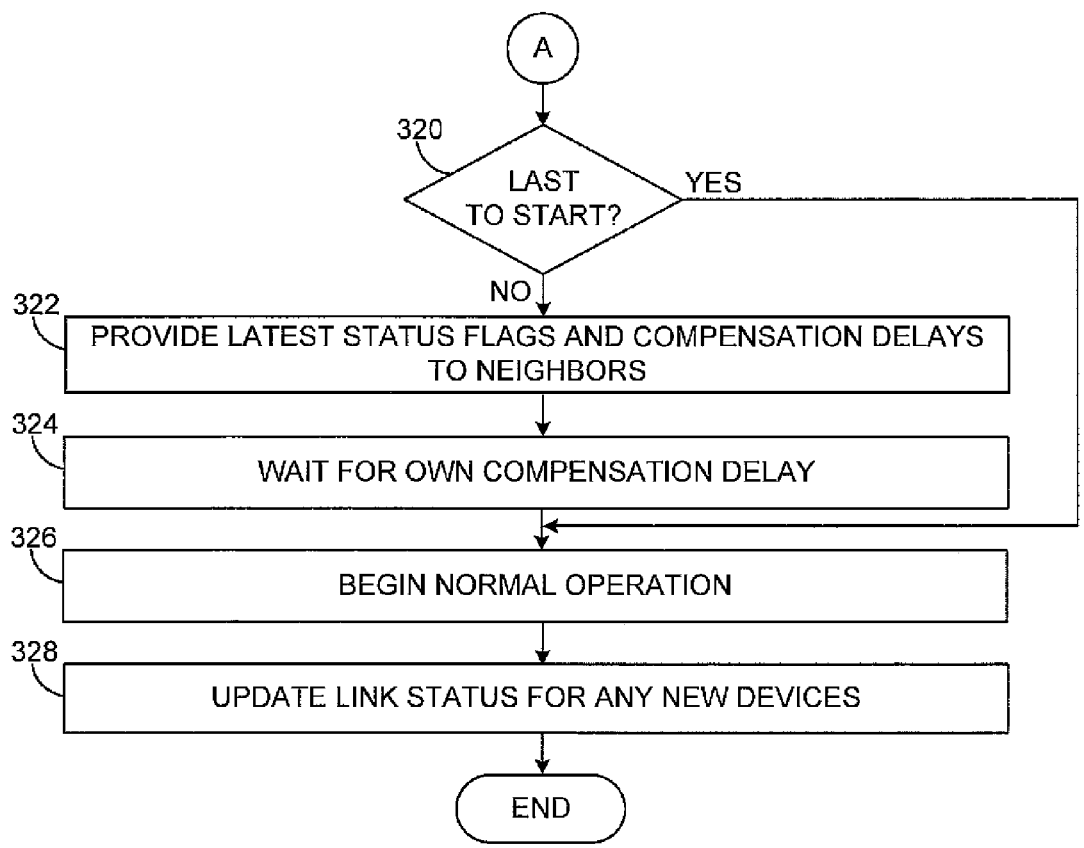
FIGS. 3A and 3B illustrate a first example method for synchronizing execution of multiple processing devices according to this disclosure.
Figure 3A:
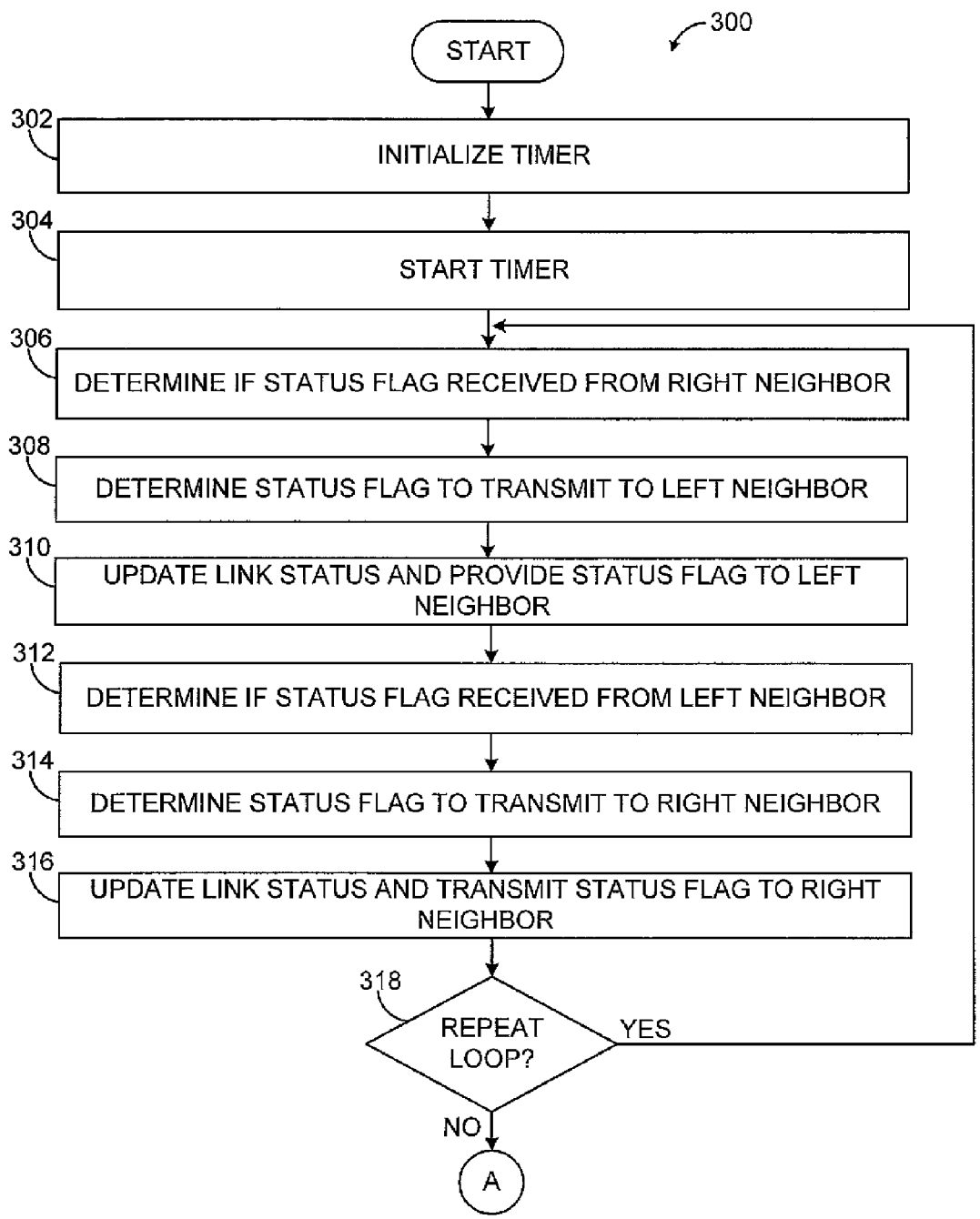

FIGS. 3A and 3B illustrate a first example method 300 for synchronizing execution of multiple processing devices according to this disclosure. This method 300 can be used with a system having any suitable number of processing devices. The method 300 could be performed at any suitable time(s). For example, the method 300 could be performed when the processing devices power up, and the method 300 could then be performed periodically after that. In the method 300, each processing device attempts to look for other processing devices with which it can synchronize. For ease of explanation, the method 300 is described with respect to the processing device 102a in the system 100 of FIG. 1, although the method could be used by the other processing devices and in other systems.

As shown in FIG. 3A, the processing device 102a initializes a timer at step 302. The timer limits the amount of time that the processing device 102a spends trying to synchronize with other processing devices. During a first iteration of the method 300 (such as when the processing device 102a is first powered on), the timer could be set equal to the length of the maximum execution cycle of the processing device 102a. For consecutive iterations of the method 300, the time set on the timer can be smaller. The timer is started at step 304.

The processing device 102a determines whether a status flag is received from its right neighbor at step 306. The status flag can identify the status of the right neighbor (the processing device 102d in FIG. 1) and any right neighbors of that neighbor (the processing devices 102c and 102b on the right of the processing device 102d in FIG. 1). A status flag received by the processing device 102a from the processing device 102d could identify the status of the processing device 102d and possibly the status of the processing device 102c and the processing device 102b. In particular embodiments, a status flag from the right neighbor could have one of the following values:

RN₁ means only the immediate right neighbor is ready;
RN₂ means only the first two right neighbors are ready;
...
$RN_{N-1}$ means all N−1 right neighbors are ready (where N is the total number of processing devices).
In these embodiments, the values of $RN_1$ through $RN_{N-1}$ may represent unique integers. Note that the processing device 102a may not receive any status flag from its right neighbor during step 306. This could occur, for instance, when the communication link 104d is down or the processing device 102d is not ready for operation.

The processing device 102a determines the status flag to be transmitted to its left neighbor at step 308. For example, if no status flag is received from the processing device 102d, the processing device 102a could select the $RN_1$ value (such as 0x01) as the status flag for its left neighbor. If the $RN_1$ value is received from the processing device 102d, the processing device 102a could select the $RN_2$ value (such as 0x02) as the status flag for its left neighbor. If the $RN_2$ value is received from the processing device 102d, the processing device 102a could select the $RN_3$ value (such as 0x03) as the status flag for its left neighbor.

The selected status flag is provided to the left neighbor and a link status is updated at step 310. This could include, for example, the processing device 102a providing the selected status flag value to its left neighbor (the processing device 102b in FIG. 1). The link status may represent a map or other data structure identifying the logical communication links from the processing device 102a to the other processing devices in the system. The link status can be updated based on the received status flag from the right neighbor.

The processing device 102a determines whether a status flag is received from its left neighbor at step 312. The status flag identifies the status of the left neighbor (the processing device 102b in FIG. 1) and any left neighbors of that neighbor (the processing devices 102c and 102d on the left of the processing device 102b in FIG. 1). A status flag received by the processing device 102a from the processing device 102b could identify the status of the processing device 102b and possibly the status of the processing device 102c and the processing device 102d. In particular embodiments, a status flag from the left neighbor could have one of the following values:

LN₁ means only the immediate left neighbor is ready;
LN₂ means only the first two left neighbors are ready;
...
$LN_{N-1}$ means all N−1 left neighbors are ready.
In these embodiments, the values of $LN_1$ through $LN_{N-1}$ may represent unique integers (unique amongst themselves and with respect to the values $RN_1$ through $RN_{N-1}$). Again, the processing device 102a may not receive any status flag from its left neighbor during step 312.

The processing device determines the status flag to be transmitted to its right neighbor at step 314. For example, if no status flag is received from the processing device 102b, the processing device 102a could select the $LN_1$ value (such as 0x04) as the status flag for its right neighbor. If the $LN_1$ value is received from the processing device 102b, the processing device 102a could select the $LN_2$ value (such as 0x08) as the status flag for its right neighbor. If the $LN_2$ value is received from the processing device 102b, the processing device 102a could select the $LN_3$ value (such as 0x0C) as the status flag for its right neighbor.

The selected status flag is provided to the right neighbor and the link status is updated at step 316. This could include, for example, the processing device 102a providing the selected status flag to its right neighbor (the processing device 102d). The link status can be updated based on the received status flag from the right neighbor.

The processing device determines if the loop is to be repeated in order to send and receive additional status flags at step 318. This could include, for example, the processing device 102a determining whether a ready condition exists. One example ready condition is that the processing device receives an $RN_{N-1}$ or $LN_{N-1}$ status flag from one of its neighbors, which indicates that all processing devices are ready and can be synchronized. Another example ready condition is that a timeout has occurred, meaning the timer has elapsed. A third example ready condition is that the processing device 102a receives data from all other processing devices with which it has a logical communication link (as defined by the link status).

If the loop is to be repeated, the processing device 102a returns to step 306 to retrieve additional status flags from and provide additional status flags to its left and right neighbors. Otherwise, the processing device 102a determines whether it is the last processing device that is starting (exiting the loop) at step 320. If so, the processing device 102a skips to step 326 and begins normal operation. In this case, since the processing device 102a is the last processing device to start, the processing device 102a could enter normal operation without performing other operations to obtain synchronization. During normal operation, the processing device 102a executes application(s) or otherwise performs functions that it routinely does when not performing the synchronization process.

If the processing device 102a is not the last processing device that is starting at step 320, the processing device 102a provides updated status flags and compensation times to its left and right neighbors at step 322. The updated status flags from the processing device 102a could indicate that all other processing devices are ready to begin normal execution by including the $RN_{N-1}$ and $LN_{N-1}$ values. The compensation times inform the left and right neighbors how long to wait before beginning normal operation. The processing device 102a also waits for its own compensation time at step 324 and begins normal operation at step 326.

The compensation times allow the various processing devices to all begin normal operation at approximately the same time, thus synchronizing the processing devices. The compensation times used by the processing devices depend on the order in which the processing devices are beginning normal operation. The processing device starting normal operation first may require the most compensation time, while the processing device(s) starting normal operation last may require the least or no compensation time. In FIG. 1, assume that the processing device 102a starts first, the processing devices 102b and 102d start second, and the processing device 102c starts last. In this case, the following compensation times could be used:

$$T_{102a\_compensation} = 2 * \text{Link Transmit Time}$$

$$T_{102b/102d\_compensation} = 1 * \text{Link Transmit Time}$$

$$T_{103c\_compensation} = 0.$$

Here, the Link Transmit Time represents the amount of time needed to transmit information to an adjacent processing device. In this way, the processing device 102a waits for the processing devices 102b-102d to be informed of the status and to enter normal operation, while the processing devices 102b and 102c wait for the processing device 102c to be informed of the status and to enter normal operation. In particular embodiments, each status flag sent between the processing devices could include a set of processing device position bits. These bits could, for example, be set or altered by a transmitting processing device to define the length of time that a receiving processing device should wait before beginning normal operation.

Once all of the processing devices have reached this state, the processing devices are substantially synchronized and operating normally. During this time, the processing devices could execute instructions or perform other operations in a substantially synchronized manner. If any new processing devices (devices that did not participate in the prior synchronization) are detected later, the link status is updated to identify the new processing devices at step 328.

In these embodiments, the link status allows the processing device 102a to know which other processing devices are participating in the synchronization process. For example, if the processing device 102d is faulty, only the three other processing devices 102a-102c may synchronize during each iteration of the method 300. Until they see status data from the processing device 102d, they may not consider the processing device 102d as part of the synchronization. Once status data from the processing device 102d has been received, the processing devices update their logical link status for the processing device 102d and consider it to be part of the execution synchronization. During the next iteration of the method 300, the new processing device(s) can participate in the process and be synchronized. This helps to avoid unnecessary waiting time for faulty processing devices and allows new processing devices to synchronize with already present processing devices.

The method 300 shown here allows very tightly coupled execution synchronization to be achieved. Also, the method 300 can be extended for any number of processing devices. This could be useful in applications such as safety-critical applications, where a larger number of processing devices may be desired or required.

Figure 4A:
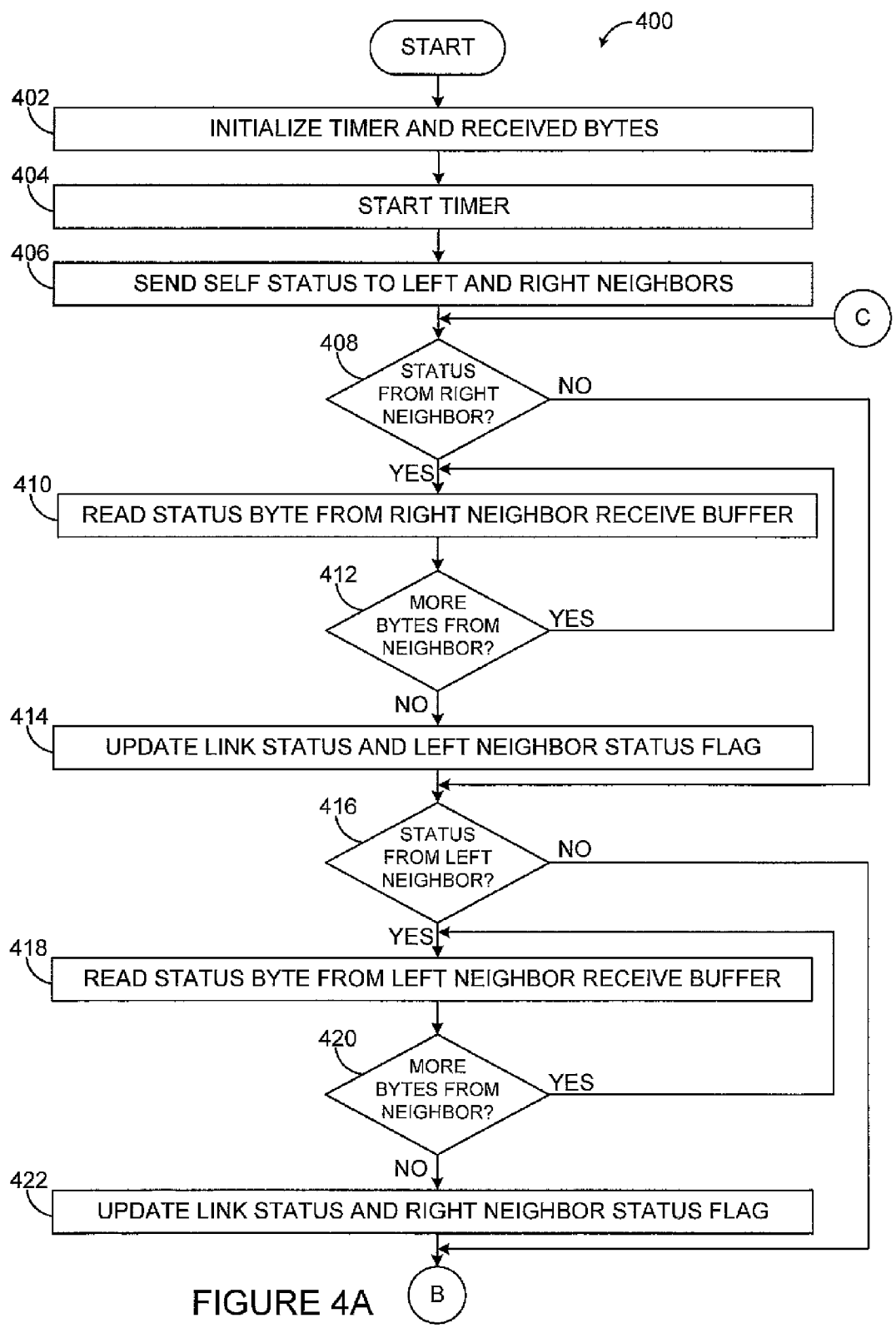
FIGS. 4A and 4B illustrate a second example method for synchronizing execution of multiple processing devices according to this disclosure.
Figure 4B:
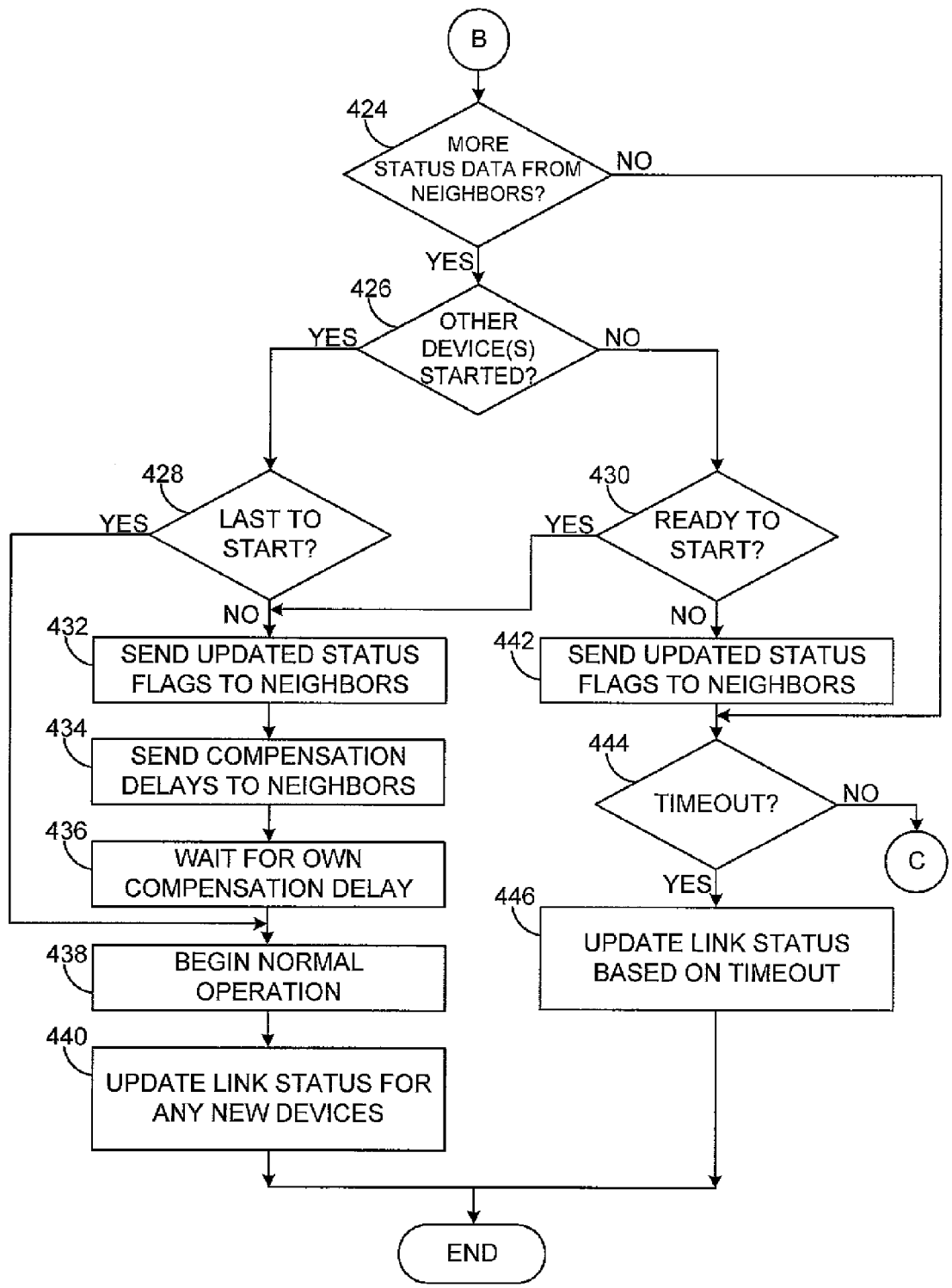

FIGS. 4A and 4B illustrate a second example method 400 for synchronizing execution of multiple processing devices according to this disclosure. Again, the method 400 can be used with a system having any suitable number of processing devices and could be performed at any suitable time(s). For ease of explanation, the method 400 is described with respect to the processing device 102a in the system 100 of FIG. 1, although the method could be used by the other processing devices and in other systems.

A timer and received bytes are initialized at step 402. This could include, for example, setting the time to a longer period during a first iteration of the method 400 and to one or more shorter periods during subsequent iterations of the method 400. This could also include the processing device 102a initializing left and right receive buffers to a value of zero. The receive buffers can be used to receive status flags from the left and right neighbors. The timer is started at step 404.

The processing device 102a sends its own status to its left and right neighbors at step 406. This could include, for example, the processing device 102a sending status flags with the $RN_1$ and $LN_1$ values to its right and left neighbors, respectively.

The processing node 102a determines whether a status is available from its right neighbor at step 408. This could include, for example, the processing device 102a determining if its right neighbor receive buffer contains data from the processing device 102d. If so, the processing device 102a reads a status byte from the right neighbor receive buffer at step 410, which may occur multiple times depending on whether more bytes from the right neighbor are available at step 412. The processing device 102a updates its link status and the status flag to be transmitted to its left neighbor at step 414. As described above, this could include selecting the $RN_1$ value if no status data is received from the right neighbor or selecting $RN_2$ through $RN_{N-1}$ if $RN_1$ through $RN_{N-2}$, respectively, is received from the right neighbor.

The processing node 102a determines whether a status is available from its left neighbor at step 416. This could include, for example, the processing device 102a determining if its left neighbor receive buffer contains data from the processing device 102b. If so, the processing device 102a reads a status byte from the left neighbor receive buffer at step 418, which may occur multiple times depending on whether more bytes from the left neighbor are available at step 420. The processing device 102a updates its link status and the status flag to be transmitted to its right neighbor at step 422. As described above, this could include selecting the $LN_1$ value if no status data is received from the left neighbor or selecting $LN_2$ through $LN_{N-1}$ if $LN_1$ through $LN_{N-2}$, respectively, is received from the left neighbor.

The processing device 102a determines if more data is available from its left and right neighbors at step 424. If not, the processing device 102a skips to step 444 to determine if a timeout has occurred. If so, the processing device 102a updates its link status based on the timeout at step 446, and the method 400 ends. The update to the link status could include identifying any processing devices that failed to respond during this iteration of the method 400, and those processing devices may be excluded from the next iteration of the method 400. If no timeout has occurred, the processing device 102a returns to step 408.

If more data is received at step 424, the processing device 102a determines whether other processing devices have started at step 426. If other processing devices have started, the processing device 102a determines whether it is the last device to start at step 428. This could include, for example, the processing device 102a using the data from its neighbors to determine whether both its left and right neighbors have started. If other processing devices have not started, the processing device 102a determines whether it is ready to start at step 430. This could include, for example, the processing device 102a determining if a ready condition exists.

If the processing device 102a is not the last to start at step 428 or is ready to start at step 430, the processing device 102a sends updated status flags to its neighbors at step 432 and sends compensation delays to its neighbors at step 434. The processing device 102a also waits for its own compensation delay at step 436. The status flags could indicate that all processing devices are ready and the processing device 102a is starting normal operation. The compensation delays could allow the processing devices to begin normal operation at approximately the same time. The processing device 102a begins normal operation at step 438, and its link status is updated to identify any new processing devices (if any are detected) at step 440.

If the processing device 102a is not yet ready to start at step 430, the processing device 102a sends updated status flags to its neighbors at step 442. This could include, for example, the processing device 102a updating the status flags based on any status data received from the right and left neighbors. The processing device 102a then determines whether a timeout has occurred at step 444.

The following pseudo-code provides a specific implementation of a method for synchronizing execution of multiple processing devices. This pseudo-code could be executed by each of the processing devices 102a-102d.

```
Initialize SyncStRxRightNeighbor and SyncStRxLeftNeighbor to zero
Initialize timer to expire after T_timeout
Start timer
If no data received from right neighbor, send RN_1 to left neighbor
If no data received from left neighbor, send LN_1 to right neighbor
Loop:
If (status data received from right neighbor)
{
    If (SyncStRxRightNeighbor = RN_1)
    {
        Set SyncStTxLeftNeighbor = RN_2
        Set link status in LogLnkStData for right neighbor
    }
    If (SyncStRxRightNeighbor = RN_2)
    {
        Set SyncStTxLeftNeighbor = RN_3
        Set link status in LogLnkStData for two right neighbors
    }
    ......
    If (SyncStRxRightNeighbor = RN_{N-2})
    {
        Set SyncStTxLeftNeighbor = RN_{N-1}
        Set link status in LogLnkStData for all right neighbors
    }
    Send SyncStTxLeftNeighbor to left neighbor
    Go to Loop_Exit if ready condition met
}
If (status data received from left neighbor)
{
    If (SyncStRxLeftNeighbor = LN_1)
    {
        Set SyncStTxRightNeighbor = LN_2
        Set link status in LogLnkStData for left neighbor
    }
    If (SyncStRxLeftNeighbor = LN_2)
    {
        Set SyncStTxRightNeighbor = LN_3
        Set link status in LogLnkStData for two left neighbors
    }
    ......
    If {SyncStRxLeftNeighbor = LN_{N-2})
    {
        Set SyncStTxRightNeighbor = LN_{N-1}
        Set link status in LogLnkStData for all left neighbors
    }
    Send SyncStTxRightNeighbor to right neighbor
    Go to Loop_Exit if ready condition met
}
Go to Loop if timer has not expired
Update logical link status based on received data from neighbors at
    Timeout if timer has expired
Exit the function
Loop_Exit:
Execute compensation delay
Update logical link status based on data from neighbors
Exit the function
```

In both of the methods 300 and 400 and the pseudo-code shown above, a determination is made whether a ready condition has been reached. The determination of whether a ready condition has been reached can be made in any suitable manner. For example, in some embodiments, each processing device could include a "ready" table or other data structure used to determine if and when the ready condition has been reached by that processing device.

An index value can be constructed and used to access one of multiple entries in the ready table, and each entry could contain only a true or false value indicating whether the ready condition exists. The index value could be constructed using the status data from both neighbors and the link status. In particular embodiments, the values $RN_1$ through (SyncStRxRightNeighbor) and $LN_1$ through $LN_{N-1}$ (SyncStRxLeftNeighbor) are selected such that the following formula can be used to calculate a unique index value into the ready table (IndexToRdyTbl).

Index*ToRdyTbl*=Sync*StRx*RightNeighbor|Sync*StRx*LeftNeighbor|Log*LnkSt*Byte.

With four processing devices 102a-102d, the ready table could be accessed as follows. The SyncStRxRightNeighbor could have one of the following values:
  0x00=Initialized value
  0x01=Only immediate right neighbor is ready
  0x02=Two immediate right neighbors are ready
  0x03=All three right neighbors are ready.
Similarly, the SyncStRxLeftNeighbor could have one of the following values:
  0x00=Initialized value
  0x04=Only immediate left neighbor is ready
  0x08=Two immediate left neighbors are ready
  0x0C=All three left neighbors are ready.
Further, the link status can be represented using a LogLnkStByte byte (eight bits), where the eight bits include:
  Bit 4=logical link status to left neighbor (LogLnkLeftNeighborSt)
  Bit 5=logical link status to other processor LogLnkOtherNeighborSt)
  Bit 6=logical link status to right neighbor (LogLnkRightNeighborSt)
and the other bits are set to zero. Bits 4 through 6 could have a value of "1" when a logical link is healthy and a value of "0" when a logical link is faulty.

In these embodiments, the index IndexToRdyTbl to the ready table can be calculated as:

Index*ToRdyTbl*=
   ((Sync*StRx*RightNeighbor|Sync*StRx*LeftNeighbor)&0x0F)|Log*LnkSt*Byte when no timeout has occurred and as:

Index*ToRdyTbl*=128+
   ((Sync*StRx*RightNeighbor|Sync*StRx*LeftNeighbor)&0x0F)

when a time has occurred. Expressed another way, the IndexToRdyTbl value could be defined as an eight-bit value where:
  Bit 7=Indicator if timeout occurred
  Bit 6=LogLnkRightNeighborSt
  Bit 5=LogLnkOtherNeighborSt
  Bit 4=LogLnkLeftNeighborSt
  Bit 3=Bit #3 of SyncStRxLeftNeighbor
  Bit 2=Bit #2 of SyncStRxLeftNeighbor
  Bit 1=Bit #1 of SyncStRxRightNeighbor
  Bit 0=Bit #0 of SyncStRxRightNeighbor.
This IndexToRdyTbl value can then be used to access Table 1, which represents a portion of the ready table (this portion assumes no timeout has occurred).

TABLE 1

| IndexToRdyTbl | | | | | | | | |
| --- | --- | --- | --- | --- | --- | --- | --- | --- |
| Bit 7 | Bit 6 | Bit 5 | Bit 4 | Bit 3 | Bit 2 | Bit 1 | Bit 0 | Ready Condition |
| 0 | 0 | 0 | 0 | 0 | 0 | 0 | 0 | 0 |
| 0 | 0 | 0 | 0 | 0 | 0 | 0 | 1 | 0 |
| 0 | 0 | 0 | 0 | 0 | 0 | 1 | 0 | 0 |
| 0 | 0 | 0 | 0 | 0 | 0 | 1 | 1 | 1 |
| 0 | 0 | 0 | 0 | 0 | 1 | 0 | 0 | 0 |
| 0 | 0 | 0 | 0 | 0 | 1 | 0 | 1 | 0 |
| 0 | 0 | 0 | 0 | 0 | 1 | 1 | 0 | 1 |
| 0 | 0 | 0 | 0 | 0 | 1 | 1 | 1 | 1 |
| 0 | 0 | 0 | 0 | 1 | 0 | 0 | 0 | 0 |
| 0 | 0 | 0 | 0 | 1 | 0 | 0 | 1 | 1 |
| 0 | 0 | 0 | 0 | 1 | 0 | 1 | 0 | 1 |
| 0 | 0 | 0 | 0 | 1 | 0 | 1 | 1 | 1 |
| 0 | 0 | 0 | 0 | 1 | 1 | 0 | 0 | 1 |
| 0 | 0 | 0 | 0 | 1 | 1 | 0 | 1 | 1 |
| 0 | 0 | 0 | 0 | 1 | 1 | 1 | 0 | 1 |
| 0 | 0 | 0 | 0 | 1 | 1 | 1 | 1 | 1 |
| 0 | 0 | 0 | 1 | 0 | 0 | 0 | 0 | 0 |

TABLE 1-continued

IndexToRdyTbl

| Bit 7 | Bit 6 | Bit 5 | Bit 4 | Bit 3 | Bit 2 | Bit 1 | Bit 0 | Ready Condition |
|---|---|---|---|---|---|---|---|---|
| 0 | 0 | 0 | 1 | 0 | 0 | 0 | 1 | 0 |
| 0 | 0 | 0 | 1 | 0 | 0 | 1 | 0 | 0 |
| 0 | 0 | 0 | 1 | 0 | 0 | 1 | 1 | 1 |
| 0 | 0 | 0 | 1 | 0 | 1 | 0 | 1 | 1 |
| 0 | 0 | 0 | 1 | 0 | 1 | 1 | 0 | 1 |
| 0 | 0 | 0 | 1 | 0 | 1 | 1 | 1 | 1 |
| 0 | 0 | 0 | 1 | 1 | 0 | 0 | 1 | 1 |
| 0 | 0 | 0 | 1 | 1 | 0 | 1 | 0 | 1 |
| 0 | 0 | 0 | 1 | 1 | 0 | 1 | 1 | 1 |
| 0 | 0 | 0 | 1 | 1 | 1 | 0 | 1 | 1 |
| 0 | 0 | 0 | 1 | 1 | 1 | 1 | 0 | 1 |
| 0 | 0 | 0 | 1 | 1 | 1 | 1 | 1 | 1 |
| 0 | 0 | 1 | 0 | 0 | 0 | 0 | 1 | 1 |
| 0 | 0 | 1 | 0 | 0 | 0 | 1 | 0 | 1 |
| 0 | 0 | 1 | 0 | 0 | 0 | 1 | 1 | 1 |
| 0 | 0 | 1 | 0 | 0 | 1 | 0 | 0 | 1 |
| 0 | 0 | 1 | 0 | 0 | 1 | 0 | 1 | 1 |
| 0 | 0 | 1 | 0 | 0 | 1 | 1 | 0 | 1 |
| 0 | 0 | 1 | 0 | 0 | 1 | 1 | 1 | 1 |
| 0 | 0 | 1 | 0 | 1 | 0 | 0 | 0 | 1 |
| 0 | 0 | 1 | 0 | 1 | 0 | 0 | 1 | 1 |
| 0 | 0 | 1 | 0 | 1 | 0 | 1 | 0 | 1 |
| 0 | 0 | 1 | 0 | 1 | 0 | 1 | 1 | 1 |
| 0 | 0 | 1 | 0 | 1 | 1 | 0 | 0 | 1 |
| 0 | 0 | 1 | 0 | 1 | 1 | 0 | 1 | 1 |
| 0 | 0 | 1 | 0 | 1 | 1 | 1 | 0 | 1 |
| 0 | 0 | 1 | 0 | 1 | 1 | 1 | 1 | 1 |
| 0 | 0 | 1 | 1 | 0 | 0 | 0 | 0 | 0 |
| 0 | 0 | 1 | 1 | 0 | 0 | 1 | 0 | 0 |
| 0 | 0 | 1 | 1 | 0 | 0 | 1 | 1 | 1 |
| 0 | 0 | 1 | 1 | 0 | 1 | 0 | 0 | 0 |
| 0 | 0 | 1 | 1 | 0 | 1 | 0 | 1 | 0 |
| 0 | 0 | 1 | 1 | 0 | 1 | 1 | 0 | 1 |
| 0 | 0 | 1 | 1 | 0 | 1 | 1 | 1 | 1 |
| 0 | 0 | 1 | 1 | 1 | 0 | 0 | 0 | 1 |
| 0 | 0 | 1 | 1 | 1 | 0 | 0 | 1 | 1 |
| 0 | 0 | 1 | 1 | 1 | 0 | 1 | 0 | 1 |
| 0 | 0 | 1 | 1 | 1 | 0 | 1 | 1 | 1 |
| 0 | 0 | 1 | 1 | 1 | 1 | 0 | 0 | 1 |
| 0 | 0 | 1 | 1 | 1 | 1 | 0 | 1 | 1 |
| 0 | 0 | 1 | 1 | 1 | 1 | 1 | 0 | 1 |
| 0 | 0 | 1 | 1 | 1 | 1 | 1 | 1 | 1 |
| 0 | 1 | 0 | 0 | 0 | 0 | 0 | 0 | 0 |
| 0 | 1 | 0 | 0 | 0 | 0 | 0 | 1 | 0 |
| 0 | 1 | 0 | 0 | 0 | 0 | 1 | 0 | 0 |
| 0 | 1 | 0 | 0 | 0 | 1 | 1 | 0 | 0 |
| 0 | 1 | 0 | 0 | 0 | 1 | 0 | 0 | 0 |
| 0 | 1 | 0 | 0 | 1 | 0 | 0 | 0 | 0 |
| 0 | 1 | 0 | 0 | 1 | 0 | 1 | 0 | 1 |
| 0 | 1 | 0 | 0 | 1 | 1 | 0 | 0 | 1 |
| 0 | 1 | 0 | 0 | 1 | 1 | 1 | 0 | 1 |
| 0 | 1 | 0 | 1 | 0 | 0 | 0 | 0 | 0 |
| 0 | 1 | 0 | 1 | 0 | 0 | 0 | 1 | 1 |
| 0 | 1 | 0 | 1 | 0 | 0 | 1 | 0 | 1 |
| 0 | 1 | 0 | 1 | 0 | 1 | 0 | 0 | 1 |
| 0 | 1 | 0 | 1 | 1 | 0 | 0 | 1 | 1 |
| 0 | 1 | 0 | 1 | 1 | 0 | 1 | 0 | 1 |
| 0 | 1 | 0 | 1 | 1 | 0 | 1 | 1 | 1 |
| 0 | 1 | 0 | 1 | 1 | 1 | 0 | 0 | 0 |
| 0 | 1 | 0 | 1 | 1 | 1 | 0 | 1 | 1 |
| 0 | 1 | 0 | 1 | 1 | 1 | 1 | 0 | 1 |
| 0 | 1 | 0 | 1 | 1 | 1 | 1 | 1 | 1 |
| 0 | 1 | 1 | 0 | 0 | 0 | 0 | 0 | 0 |
| 0 | 1 | 1 | 0 | 0 | 0 | 0 | 1 | 0 |
| 0 | 1 | 1 | 0 | 0 | 0 | 1 | 0 | 1 |
| 0 | 1 | 1 | 0 | 0 | 0 | 1 | 1 | 1 |
| 0 | 1 | 1 | 0 | 0 | 1 | 0 | 0 | 0 |
| 0 | 1 | 1 | 0 | 0 | 1 | 0 | 1 | 0 |
| 0 | 1 | 1 | 0 | 0 | 1 | 1 | 0 | 1 |
| 0 | 1 | 1 | 0 | 0 | 1 | 1 | 1 | 1 |
| 0 | 1 | 1 | 0 | 1 | 0 | 0 | 0 | 0 |
| 0 | 1 | 1 | 0 | 1 | 0 | 0 | 1 | 1 |
| 0 | 1 | 1 | 0 | 1 | 0 | 1 | 0 | 1 |
| 0 | 1 | 1 | 0 | 1 | 0 | 1 | 1 | 1 |
| 0 | 1 | 1 | 0 | 1 | 1 | 0 | 0 | 1 |
| 0 | 1 | 1 | 0 | 1 | 1 | 0 | 1 | 1 |
| 0 | 1 | 1 | 0 | 1 | 1 | 1 | 0 | 1 |
| 0 | 1 | 1 | 0 | 1 | 1 | 1 | 1 | 1 |
| 0 | 1 | 1 | 1 | 0 | 0 | 0 | 0 | 0 |
| 0 | 1 | 1 | 1 | 0 | 0 | 1 | 0 | 0 |
| 0 | 1 | 1 | 1 | 0 | 0 | 1 | 0 | 0 |
| 0 | 1 | 1 | 1 | 0 | 1 | 1 | 1 | 1 |
| 0 | 1 | 1 | 1 | 0 | 1 | 0 | 0 | 0 |
| 0 | 1 | 1 | 1 | 0 | 1 | 0 | 1 | 0 |
| 0 | 1 | 1 | 1 | 0 | 1 | 1 | 0 | 1 |
| 0 | 1 | 1 | 1 | 0 | 1 | 1 | 1 | 1 |
| 0 | 1 | 1 | 1 | 1 | 0 | 0 | 0 | 0 |
| 0 | 1 | 1 | 1 | 1 | 0 | 1 | 1 | 1 |
| 0 | 1 | 1 | 1 | 1 | 0 | 1 | 0 | 1 |
| 0 | 1 | 1 | 1 | 1 | 0 | 1 | 1 | 1 |
| 0 | 1 | 1 | 1 | 1 | 1 | 0 | 0 | 1 |
| 0 | 1 | 1 | 1 | 1 | 1 | 0 | 1 | 1 |
| 0 | 1 | 1 | 1 | 1 | 1 | 1 | 0 | 1 |
| 0 | 1 | 1 | 1 | 1 | 1 | 1 | 1 | 1 |

In Table 1, the first eight columns represent the IndexToRdyTbl value, and the last column defines whether a ready condition exists. Using this table, a processing device 102a could quickly construct the IndexToRdyTbl value based on current data and quickly access the ready table to identify whether a ready condition exists ("1") or not ("0").

Although FIGS. 3A through 4B illustrate examples of methods for synchronizing execution of multiple processing devices, various changes may be made to FIGS. 3A through 4B. For example, while each method 300 and 400 is shown as a series of steps, various steps in each method 300 and 400 could overlap, occur in parallel, occur in a different order, or occur multiple times. The same is true for the pseudo-code shown above. Moreover, note that the use of a ready table is for illustration only and is not required.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A system comprising:
an industrial process controller configured to control at least a portion of an industrial process;
wherein the industrial process controller comprises multiple processing devices, each processing device configured to:
receive first and second status flags from first and second neighboring processing devices, respectively, each status flag identifying whether one or more of the processing devices are ready for operation;
determine that all processing devices are ready for operation using the status flags; and
wait for a specified amount of time before entering operation, the specified amount of time selected so that the processing devices are substantially synchronized; and
wherein the processing devices as substantially synchronized are configured to execute common control logic, receive common measurements of the industrial process, and generate control signals for controlling one or more common characteristics of the industrial process.

2. The system of claim 1, wherein:
the processing devices are coupled together in a ring configuration;
the first neighboring processing device comprises a right neighboring processing device in the ring configuration; and
the second neighboring processing device comprises a left neighboring processing device in the ring configuration.

3. The system of claim 2, wherein:
the first status flag identifies a status of the right neighboring processing device and optionally a status of one or more processing devices on a right of the right neighboring processing device; and
the second status flag identifies a status of the left neighboring processing device and optionally a status of one or more processing devices on a left of the left neighboring processing device.

4. The system of claim 3, wherein:
a number of processing devices in the ring configuration is equal to N; and
each processing device is configured to determine whether all processing devices are ready for operation by determining whether at least one of the status flags indicates that N−1 processing devices are ready for operation.

5. The system of claim 1, wherein each processing device is configured to determine whether all processing devices are ready for operation by:
constructing an index value using the status flags; and
accessing an entry in a look-up table using the index value, the entry defining whether all processing devices are ready for operation.

6. The system of claim 5, wherein:
each processing device is configured to maintain a link status identifying a state of logical communication links to other processing devices; and
each processing device is configured to construct the index value using the status flags and the link status.

7. The system of claim 1, wherein:
each processing device is configured to perform the receiving, determining, and waiting operations during each of multiple iterations of a synchronization process;
each processing device is configured to maintain a link status identifying a state of logical communication links to other processing devices; and
each processing device is configured to update the link status during one iteration of the synchronization process to identify one or more additional processing devices such that, during a subsequent iteration of the synchronization process, the one or more additional processing devices are synchronized.

8. The system of claim 1, wherein:
each processing device is configured to perform the receiving, determining, and waiting operations during each of multiple iterations of a synchronization process;
the synchronization process is associated with a timer defining a length of each iteration;
each processing device is configured to maintain a link status identifying a state of logical communication links to other processing devices; and
when the timer expires prior to the processing devices determining that all processing devices are ready for operation during one iteration, each processing device is configured to update the processing device's link status to exclude one or more processing devices from a subsequent iteration of the synchronization process.

9. The system of claim 1, wherein:
a first of the processing devices to determine that all processing devices are ready for operation waits for a longest specified amount of time before entering operation; and
a last of the processing devices to determine that all processing devices are ready for operation waits for a shortest specified amount of time before entering operation.

10. The system of claim 1, wherein all of the processing devices are configured to execute common instructions synchronously.

11. The system of claim 10, wherein all of the processing devices are configured to read data from and write data to common field devices synchronously in the industrial process.

12. A method comprising:
substantially synchronizing multiple processing devices, including:
receiving, at a first of the processing devices, status flags from at least one other of the processing devices, each status flag identifying whether one or more of the processing devices are ready for operation;
determining that all processing devices are ready for operation using at least one of the status flags; and waiting for a specified amount of time before entering operation, the specified amount of time selected so that the processing devices are substantially synchronized; and controlling at least a portion of an industrial process using the processing devices as substantially synchronized, wherein the processing devices as substantially synchronized execute common control logic, receive common measurements of the industrial process, and generate control signals for controlling one or more common characteristics of the industrial process.

13. The method of claim 12, wherein:
the at least one other processing device comprises a right neighboring processing device and a left neighboring processing device; and
the status flags comprise:
   a first status flag identifying a status of the right neighboring processing device and optionally a status of one or more processing devices on a right of the right neighboring processing device; and
   a second status flag identifying a status of the left neighboring processing device and optionally a status of one or more processing devices on a left of the left neighboring processing device.

14. The method of claim 13, wherein:
a number of processing devices in a ring configuration is equal to N; and
determining that all processing devices are ready for operation comprises determining that at least one of the status flags indicates that N−1 processing devices are ready for operation.

15. The method of claim 13, further comprising:
maintaining a link status identifying a state of logical communication links between the first processing device and the at least one other processing device;
wherein determining that all processing devices are ready for operation comprises:
   constructing an index value using the status flags and the link status; and
   accessing an entry in a look-up table using the index value, the entry defining whether all processing devices are ready for operation.

16. The method of claim 15, wherein:
the first status flag comprises one of multiple first unique values;
the second status flag comprises one of multiple second unique values; and
the first and second unique values are selected such that a unique index value into the look-up table is constructed using the first unique value in the first status flag, the second unique value in the second status flag, and the link status.

17. The method of claim 12, wherein:
the receiving, determining, and waiting steps are performed during each of multiple iterations of a synchronization process; and
the method further comprises:
   maintaining a link status identifying a state of logical communication links between the first processing device and the at least one other processing device; and
   updating the link status during one iteration of the synchronization process to identify one or more additional processing devices such that, during a subsequent iteration of the synchronization process, the one or more additional processing devices are synchronized.

18. The method of claim 12, wherein:
the receiving, determining, and waiting steps are performed during each of multiple iterations of a synchronization process;
the synchronization process is associated with a timer defining a length of each iteration; and
the method further comprises:
   maintaining a link status identifying a state of logical communication links between the first processing device and the at least one other processing device; and
   when the timer expires prior to determining that all processing devices are ready for operation during one iteration, updating the link status to exclude one or more processing devices from a subsequent iteration of the synchronization process.

19. A non-transitory computer readable medium embodying a computer program, the computer program comprising computer readable program code for:
substantially synchronizing multiple processing devices, including:
   receiving, at a first of the processing devices, status flags from at least one other of the processing devices, each status flag identifying whether one or more of the processing devices are ready for operation;
   determining that all processing devices are ready for operation using at least one of the status flags; and
   waiting for a specified amount of time before entering operation, the specified amount of time selected so that the processing devices are substantially synchronized; and
controlling at least a portion of an industrial process using the processing devices as substantially synchronized;
wherein the processing devices as substantially synchronized execute common control logic, receive common measurements of the industrial process, and generate control signals for controlling one or more common characteristics of the industrial process.

20. The non-transitory computer readable medium of claim 19, wherein:
the at least one other processing device comprises a right neighboring processing device in a ring configuration and a left neighboring processing device in the ring configuration;
a number of processing devices in the ring configuration is equal to N;
the status flags comprise:
   a first status flag identifying a status of the right neighboring processing device and optionally a status of one or more processing devices on a right of the right neighboring processing device;
   a second status flag identifying a status of the left neighboring processing device and optionally a status of one or more processing devices on a left of the left neighboring processing device; and
the computer readable program code for determining that all processing devices are ready for operation comprises computer readable program code for determining whether at least one of the status flags indicates that N−1 processing devices are ready for operation.

21. The non-transitory computer readable medium of claim 19, further comprising:
computer readable program code for maintaining a link status identifying a state of logical communication links between the first processing device and the at least one other processing device;

wherein the computer readable program code for determining that all processing devices are ready for operation comprises computer readable program code for:
constructing an index value using the status flags and the link status; and
accessing an entry in a look-up table using the index value, the entry defining whether all processing devices are ready for operation.

22. The non-transitory computer readable medium of claim 19, wherein:
the receiving, determining, and waiting operations are performed during each of multiple iterations of a synchronization process;
the synchronization process is associated with a timer defining a length of each iteration; and
the computer readable medium further comprises computer readable program code for:
maintaining a link status identifying a state of logical communication links between the first processing device and the at least one other processing device;
updating the link status during one of the iterations to identify one or more additional processing devices such that, during a first subsequent iteration of the synchronization process, the one or more additional processing devices are synchronized; and
when the timer expires prior to determining that all processing devices are ready for operation during another of the iterations, updating the link status to exclude one or more processing devices from a second subsequent iteration of the synchronization process.

* * * * *